United States Patent
Bivens et al.

(10) Patent No.: US 11,537,876 B2
(45) Date of Patent: Dec. 27, 2022

(54) TARGETED VARIATION OF MACHINE LEARNING INPUT DATA

(71) Applicant: Bank of America Corporation, Charlotte, NC (US)

(72) Inventors: Vaughn M. Bivens, Charlotte, NC (US); Ganesh Bonda, Charlotte, NC (US); Stephen C. Cauthorne, Richmond, VA (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 917 days.

(21) Appl. No.: 16/202,417

(22) Filed: Nov. 28, 2018

(65) Prior Publication Data

US 2020/0167643 A1    May 28, 2020

(51) Int. Cl.
*G06N 3/08*    (2006.01)
*G06N 3/04*    (2006.01)

(52) U.S. Cl.
CPC .............. *G06N 3/08* (2013.01); *G06N 3/0445* (2013.01)

(58) Field of Classification Search
CPC ......... G06N 20/00; G06N 3/08; G06N 3/0445
See application file for complete search history.

(56) References Cited

U.S. PATENT DOCUMENTS

| | | |
|---|---|---|
| 6,216,129 B1 | 4/2001 | Eldering |
| 6,298,348 B1 | 10/2001 | Eldering |
| 7,062,510 B1 | 6/2006 | Eldering |
| 7,313,536 B2 | 12/2007 | Westphal |
| 7,343,326 B2 | 3/2008 | Westphal |
| 8,032,422 B2 | 10/2011 | Pickard et al. |
| 8,255,392 B2 | 8/2012 | Melton |
| 8,781,917 B2 | 7/2014 | Westphal et al. |
| 10,083,459 B2 | 9/2018 | Satyamoorthy et al. |
| 10,467,339 B1* | 11/2019 | Shen ..................... G06F 40/242 |
| 2010/0004978 A1 | 1/2010 | Pickard et al. |
| 2014/0278795 A1 | 9/2014 | Satyamoorthy et al. |
| 2017/0011428 A1 | 1/2017 | Guenther |
| 2018/0314938 A1* | 11/2018 | Andoni .................. G06N 3/086 |
| 2020/0082299 A1* | 3/2020 | Vasconcelos .......... G06N 20/00 |
| 2020/0082300 A1* | 3/2020 | Farrar .................... G06N 20/00 |
| 2020/0151555 A1* | 5/2020 | Kozhaya ................. G06N 3/08 |
| 2020/0372472 A1* | 11/2020 | Kenthapadi ............ G06N 20/20 |

* cited by examiner

*Primary Examiner* — Ying Yu Chen
(74) *Attorney, Agent, or Firm* — Banner & Witcoff, Ltd.

(57) ABSTRACT

Machine learning models, semantic networks, adaptive systems, artificial neural networks, convolutional neural networks, and other forms of knowledge processing systems are disclosed. Input data for a machine learning system may be analyzed to determine one or more potential biases in the input data. Based on the one or more potential biases, the input data may be grouped, and/or weights may be applied to one or more portions of the input data. The input data may be input into a machine learning algorithm, which may generate output data. Based on an evaluation of the output data, the input data may be grouped, and/or second weights may be applied to one or more portions of the input data.

12 Claims, 3 Drawing Sheets

TARGETED VARIATION OF MACHINE LEARNING INPUT DATA

TECHNICAL FIELD

This disclosure pertains to machine learning models, semantic networks, adaptive systems, artificial neural networks, convolutional neural networks, and other forms of knowledge processing systems.

BACKGROUND

Machine learning has enabled the automated processing of problems formerly limited to human intervention. Traditionally, computers have been explicitly programmed to perform tasks, meaning that even fairly simple tasks can take significant amounts of programming time to implement. Machine learning may be used to allow a computer to perform the same or similar tasks without being explicitly programmed to do so. For example, where formerly a programmer may have manually programmed a face detection algorithm (e.g., providing code telling a computer to look for two eyes, a nose, and a mouth), machine learning may be used instead by providing a computer with a large set of pictures of human faces (e.g., some winking, some smiling, some partially obscured) and rewarding the computer for correct identifications of human faces over repeated trials. Colloquially, such methods may be said to allow a machine learning algorithm to both think and learn.

Machine learning has benefits far beyond programming efficiency: machines may also learn and identify correlations in data that would otherwise go undetected if reviewed by humans. For example, a video game company may know that players are likely to play video games during weekends, but may be unable to determine a formerly unknown correlation between weather (e.g., the cold and/or amount of snow) and the number of players on a game at any given time. While a human would be unlikely to detect such a correlation given the volume of data involved and a lack of a motivation to compare such datasets, a machine learning algorithm may do so largely without human intervention.

Machine learning algorithms are asked to label data in large data sets. For example, a machine learning algorithm may be asked to label a face in a photograph, or to indicate the presence or absence of a face in an entire photo. Other forms of machine learning algorithm output have been implemented. For example, a machine learning algorithm may be asked to make future predictions based on current data, may be asked to group data, may be asked to determine human-language responses to queries, or the like.

Machine learning is of increasing interest in fields where significant human time and subjective decision-making is otherwise necessary. Many voice-controlled artificial intelligence (AI) systems rely on machine learning to better understand spoken words and phrases. While human-programmed voice recognition systems have existed previously, machine learning algorithms allow for the rapid adaptation of voice-controlled AI systems to handle, for example, poorly spoken words and colloquialisms. Machine learning can even be used for areas of subjective taste. For example, Netflix, Inc. of Los Gatos, Calif. uses machine learning to improve its video recommendation engine. While programming a video recommendation engine by hand is possible (e.g., one that recommends action movies if a user watches many action movies), machine learning algorithms have proven particularly adept at identifying and acting on user preferences that are not easily predicted.

Machine learning is still nascent in many fields, and the integration of its capabilities still leaves much room for improvement. Particularly, machine learning is particularly vulnerable to bias. For example, machine learning may readily determine easy correlations in data (e.g., that wealthier customers are more likely to purchase expensive vehicles), but may have difficulty making more nuanced correlations in data (e.g., that customers in a particular neighborhood are likely to purchase a certain brand of vehicle because others in the neighborhood own vehicles from the same brand). As another example, a machine learning algorithm tasked with maximizing a score in the game Tetris® by The Tetris Company of Honolulu, Hi. may stack blocks and pause the game, rather than clear blocks by forming perfect rows, because the machine learning algorithm may not learn that clearing blocks can, over time, lead to a higher score. And, even though a machine learning algorithm may provide correct output, such output is not always helpful, particularly because additional value may be found in exploring different permutations and interpretations of output under different circumstances.

SUMMARY

The following summary presents a simplified summary of certain features. The summary is not an extensive overview and is not intended to identify key or critical elements.

Methods, systems, and apparatuses for modifying machine learning input data in order to mitigate machine learning bias and explore correlations in data. A computing device may receive input data, which may be input into a machine learning algorithm. The computing device may determine potential biases in the input data. For example, the input data may suggest that quantitative data is more important than qualitative data, may have insufficient quantities of a certain type of data, or otherwise may suggest that the machine learning algorithm may place an undesired emphasis on one or more portions of the input data. Based on the potential biases, the input data may be grouped, and weights may be applied to the input data. The grouped and/or weighted input data may be provided to the machine learning algorithm, which may process the grouped and/or weighted input data, e.g., using an artificial neural network, to produce output data. The output data may be evaluated to determine, e.g., one or more output biases. Based on the output biases, one or more second weights may be applied to the input data, and/or the input data may be differently and/or further grouped. This process may be repeated in order to dynamically evaluate the input and output of a machine learning algorithm to, for example, explore correlations in the input and/or output data.

These and other features and advantages are described in more detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a preliminary introduction to the subject matter, machine learning algorithms sometimes rely on unique computing system structures. Such unique computing system structures may be referred to as machine learning engines. Machine learning algorithms may leverage artificial neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making.

Figure 1:
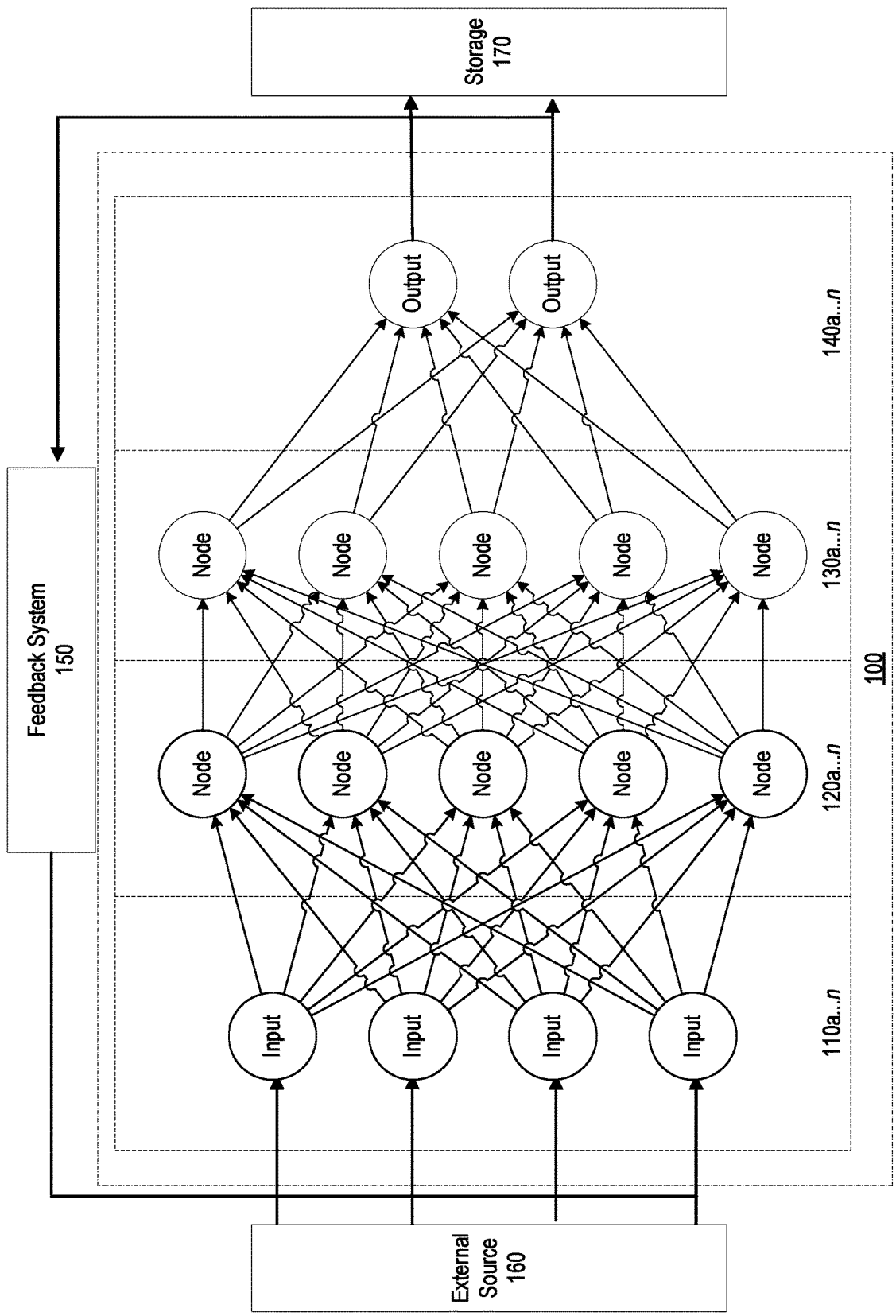
FIG. 1 shows an illustrative artificial neural network on which a machine learning algorithm may be executed in accordance with one or more examples described herein.

FIG. 1 illustrates a simplified example of an artificial neural network 100 on which a machine learning algorithm may be executed. FIG. 1 is merely an example of nonlinear processing using an artificial neural network; other forms of nonlinear processing may be used to implement a machine learning algorithm in accordance with features described herein.

In FIG. 1, each of input nodes 110a-n is connected to a first set of processing nodes 120a-n. Each of the first set of processing nodes 120a-n is connected to each of a second set of processing nodes 130a-n. Each of the second set of processing nodes 130a-n is connected to each of output nodes 140a-n. Though only two sets of processing nodes are shown, any number of processing nodes may be implemented. Similarly, though only four input nodes, five processing nodes, and two output nodes per set are shown in FIG. 1, any number of nodes may be implemented per set. Data flows in FIG. 1 are depicted from left to right: data may be input into an input node, may flow through one or more processing nodes, and may be output by an output node. Input into the input nodes 110a-n may originate from an external source 160. Output may be sent to a feedback system 150 and/or to storage 170. The feedback system 150 may send output to the input nodes 110a-n for successive processing iterations with the same or different input data.

FIG. 1 depicts nodes that may perform various types of processing, such as discrete computations, computer programs, and/or mathematical functions implemented by a computing device. For example, the input nodes 110a-n may comprise logical inputs of different data sources, such as one or more data servers. The processing nodes 120a-n may comprise parallel processes executing on multiple servers in a data center. And, the output nodes 140a-n may be the logical outputs that ultimately are stored in results data stores, such as the same or different data servers as for the input nodes 110a-n. Notably, the nodes need not be distinct. For example, two nodes in any two sets may perform the exact same processing. The same node may be repeated for the same or different sets.

Nodes may be configured to perform various tasks. For example, the nodes may be configured to perform component tasks such as representation, evaluation, and/or optimization. Representation refers to performing steps that represent knowledge in different ways, e.g., using one or more decision trees, sets of rules, instances, graphical models, neural networks (e.g., such that a node of a first neural network may itself be a second neural network), support vector machines, model ensembles, or the like. Evaluation refers to performing steps to represent the way hypotheses (e.g., candidate programs) are evaluated, e.g., relating to accuracy, prediction, recall, squared error, likelihood, posterior probability, cost, margin, entropy k-L divergence, and the like. Optimization refers to performing steps relating to combinatorial optimization, convex optimization, constrained optimization, and the like.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 100 may learn and/or be dynamically reconfigured. Though nodes are depicted as having connections only to successive nodes in FIG. 1, connections may be formed between any nodes. For example, one processing node may be configured to send output to a previous processing node.

Input received in the input nodes 110a-n may be processed through processing nodes, such as the first set of processing nodes 120a-n and the second set of processing nodes 130a-n. The processing may result in output in output nodes 140a-n. As depicted by the connections from the first set of processing nodes 120a-n and the second set of processing nodes 130a-n, processing may comprise multiple steps or sequences. For example, the first set of processing nodes 120a-n may be a rough data filter, whereas the second set of processing nodes 130a-n may be a more detailed data filter.

The artificial neural network 100 may be configured to effectuate decision-making. As a simplified example for the purposes of explanation, the artificial neural network 100 may be configured to detect faces in photographs. The input nodes 110a-n may be provided with a digital copy of a photograph. The first set of processing nodes 120a-n may be each configured to perform specific steps to remove non-facial content, such as large contiguous sections colors associated with colors other than skin tones. The second set of processing nodes 130a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 100 may then predict the location on the face. The prediction may be correct or incorrect.

The feedback system 150 may be configured to determine whether or not the artificial neural network 100 made a correct decision. Feedback may comprise an indication of a correct answer and/or an indication of an incorrect answer and/or a degree of correctness (e.g., a percentage). For example, in the facial recognition example provided above, the feedback system 150 may be configured to determine if the face was correctly identified and, if so, what percentage of the face was correctly identified. The feedback system 150 may already know a correct answer, such that the feedback system may train the artificial neural network 100 by indicating whether it made a correct decision. The feedback system 150 may comprise human input, such as an administrator telling the artificial neural network 100 whether it made a correct decision. The feedback system may provide feedback (e.g., an indication of whether the previous output was correct or incorrect) to the artificial neural network 100 via input nodes 110a-n or may transmit such information to one or more nodes. The feedback system 150 may additionally or alternatively be coupled to the storage 170 such that output is stored. The feedback system may not have correct answers at all, but instead base feedback on further processing: for example, the feedback system may comprise a system programmed to identify faces, such that the feedback allows the artificial neural network 100 to compare its results to that of a manually programmed system.

A machine learning algorithm involving feedback (e.g., from the feedback system 150) may be referred to as supervised. In contrast, a machine learning algorithm without feedback (e.g., such that the feedback system 150 would not be used) may be referred to as unsupervised. If example data (e.g., properly labeled data) is provided to the machine learning algorithm, but feedback is not provided based on machine learning output, the machine learning algorithm may be referred to as semi-supervised. If the feedback system 150 provides a form of correct output (e.g., an identification of a face), the machine learning algorithm may be said to involve active learning.

The artificial neural network 100 may be dynamically modified to learn and provide better input. Based on, for example, previous input and output and feedback from the feedback system 150, the artificial neural network 100 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 100, such that the artificial neural network 100 may vary its nodes and connections to test hypotheses. For example, the artificial neural network 100 may use gradient descent, an optimizer, or similar techniques to update weights associated with one or more nodes based on previous input, previous output, and/or feedback from the feedback system 150.

The artificial neural network 100 need not have a set number of processing nodes or number of sets of processing nodes, but may increase or decrease its complexity. For example, the artificial neural network 100 may determine that one or more processing nodes are unnecessary or should be repurposed, and either discard or reconfigure the processing nodes on that basis. As another example, the artificial neural network 100 may determine that further process-ing of all or part of the input is required and add additional processing nodes and/or sets of processing nodes on that basis.

The feedback provided by the feedback system 150 may be mere reinforcement (e.g., providing an indication that output is correct or incorrect, awarding the machine learning algorithm a number of points, or the like) or may be specific (e.g., providing the correct output). For example, a machine learning algorithm executing on the artificial neural network 100 may be asked to detect faces in photographs. Based on an output, the feedback system 150 may indicate a score (e.g., 75% accuracy, an indication that the guess was accurate, or the like) or a specific response (e.g., specifically identifying where the face was located).

The artificial neural network 100 may be supported or replaced by other forms of machine learning. For example, one or more of the nodes of artificial neural network 100 may implement a decision tree, associational rule set, logic programming, regression model, cluster analysis mechanisms, Bayesian network, propositional formulae, generative models, and/or other algorithms or forms of decision-making. The artificial neural network 100 may effectuate deep learning.

Figure 2:
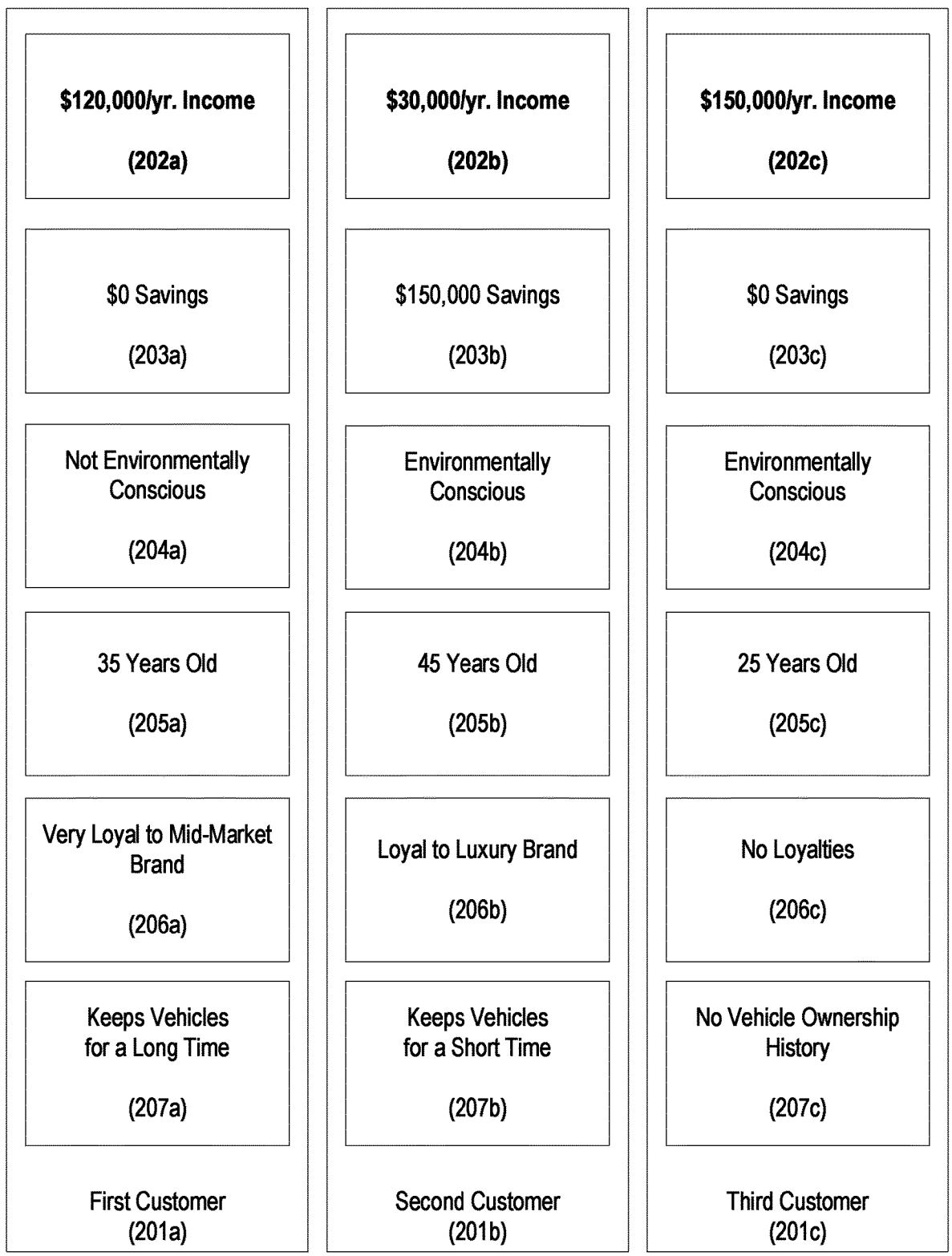
FIG. 2 shows exemplary data which may result in bias when processed by a machine learning algorithm.

FIG. 2 depicts exemplary data relating to customers which may lead machine learning algorithms, such as may be executed on the artificial neural network 100, to result in one or more output biases in output data. Three customers are shown in FIG. 2: a first customer 201a, second customer 201b, and a third customer 201c. The data shown in FIG. 2 is simplified for the purposes of explanation.

Data corresponding to these customers is shown on a variety of exemplary dimensions. With respect to income, the first customer 201a has an income of $120,000 per year (as shown in block 203a), the second customer 201b has an income of $30,000 per year (as shown in block 203b), and the third customer 201c has an income of $150,000 per year (as shown in block 203c). With respect to savings, the first customer 201a has no savings (as shown in block 203a), the second customer 201b has $150,000 in savings (as shown in block 203b), and the third customer 201c has no savings (as shown in block 203c). With respect to environmental behavior, the first customer 201a is not environmentally conscious (as shown in block 204a), the second customer 201b is environmentally conscious (as shown in block 204b), and the third customer 201c is environmentally conscious (as shown in block 204c). With respect to age, the first customer 201a is thirty-five years old (as shown in block 205a), the second customer 201b is forty-five years old (as shown in block 205b), and the third customer 201c is twenty-five years old (as shown in block 205c). With respect to brand loyalty, first customer 201a is very loyal to a mid-market brand (as shown in block 206a), second customer 201b is loyal to a luxury brand (as shown in block 206b), and third customer 201c has no loyalties (as shown in block 206c). With respect to how long each customer owns a vehicle, the first customer 201a keeps their vehicles for a long time (as shown in block 207c), the second customer 201b keeps their vehicles for a short time (as shown in block 207b), and the third customer 201c has never owned a vehicle.

A machine learning algorithm may, when presented with data such as that depicted in FIG. 2, place undesirable emphasis on factors such that, e.g., other, perhaps more nuanced but equally important factors are ignored. A machine learning algorithm may, for instance, be configured to determine, using the data depicted in FIG. 2, which customers are likely to purchase an expensive luxury sedan. The machine learning algorithm may, based on such data, undesirably emphasize the importance of income, a quantitative value, over factors such as brand loyalty, which is less readily quantified and may instead be represented as a Boolean value or string. For example, if the expensive luxury sedan cost $50,000, the machine learning algorithm may rule out the possibility that the second customer 201b would purchase the vehicle because it significantly exceeds their income. The machine learning algorithm may thereby undesirably ignore that the second customer 201b may nonetheless purchase the vehicle because they have $150,000 in savings and because they are loyal to the luxury brand, meaning that they may be more likely to purchase the expensive luxury sedan using their savings and in spite of their income. In other words, the machine learning algorithm may place undesirable emphasis onto some factors, like a customers' income, without considering other factors, such as, e.g., that a customer is particularly loyal to the luxury brand. Additional factors may be relevant to such a determination and yet, similarly, be ignored. For example, if the expensive luxury sedan is not particularly eco-friendly (e.g., if it has a V8 engine), the environmentally-friendly second customer 201b may be less likely to dip into savings to purchase the sedan despite their loyalty to the brand. As another example, the machine learning algorithm may place undesirable emphasis on the relatively greater income of the third customer 201c despite the fact that the third customer is relatively young, has no brand loyalties, has no vehicle ownership history, and is, like the second customer 201b, environmentally conscious. As yet another example, the machine learning algorithm may place undesirable emphasis on the income of the first customer 201a and assume that the first customer 201a might purchase the vehicle despite the indication that the first customer 201a is very loyal to a mid-market brand and thus unlikely to purchase an expensive luxury sedan of a different brand.

One reason why machine learning algorithms may place undue weight on data like customer income is that input into the machine learning algorithm may be itself biased. A data type used to reflect information may bias the machine learning algorithm. For example, for the first customer 201a, a quantitative figure is known for income, and yet the degree to which the first customer 201a is environmentally friendly may merely be reflected as a Boolean value. A machine learning algorithm comparing such data may more readily rely on the quantitative value as compared to the Boolean value. Similarly, some data sets may lack a full set of data for every customer such that, for example, the income of all customers is known, but only few customers are associated with loyalty data.

Moreover, machine learning algorithms may lack context for input data, leading to undesirable conclusions which rely on undesirable assumptions in input data. For example, the example detailed above assumed that the expensive luxury sedan costs $50,000, which a machine learning algorithm may assume based on input data is a fixed price; however, the price of the expensive luxury sedan may in fact be flexible based on dealer incentives, rebates, and the like, which may not be reflected in the input data. As a particularized example, the expensive luxury sedan may be sold at $45,000 such that more customers buy the sedan, leading to more customers purchasing service/maintenance, and therefore leading to increased profit for the sedan manufacturer. As another example, the loyalty information reflected in block 206a, block 206b, and block 206c may in fact be extremely reliable, whereas the income and/or savings information depicted in FIG. 2 may be significantly less reliable, due to the manner in which both sets of data were collected. As such, the machine learning algorithm may place an undesirable emphasis on unreliable quantitative data over more reliable, albeit less quantitative, data.

Also, machine learning algorithms may be limited in that the nature and quality of input data may undesirably bias output data. For example, as discussed above, if the input data comprises both quantitative and qualitative data, the former may be undesirably emphasized over the latter. As another example, if the input data is particularly limited (e.g., in scope, size, or the like), the output data may be similarly limited.

Figure 3:
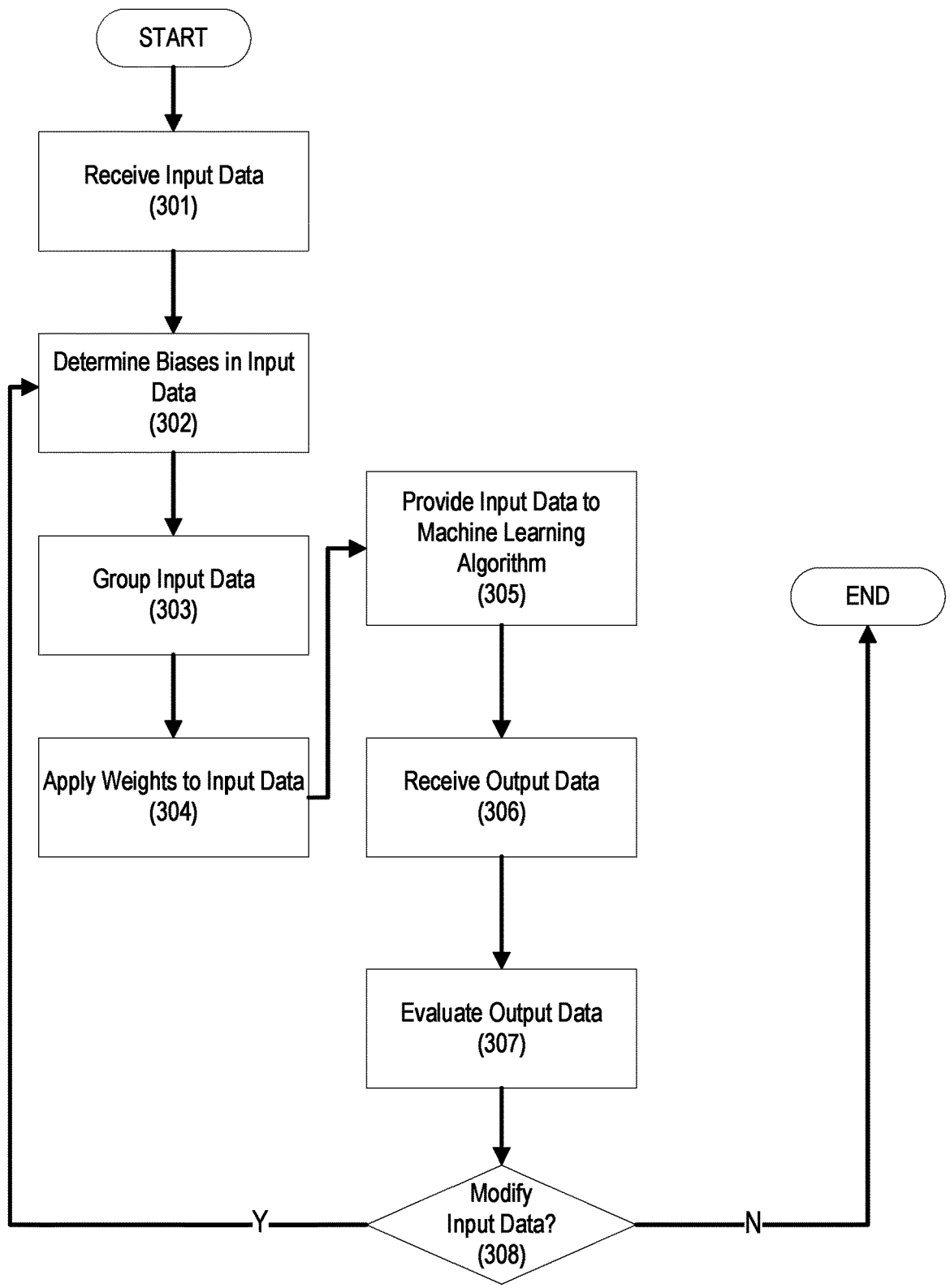
FIG. 3 shows a flow chart which may be performed with respect to a machine learning algorithm.

FIG. 3 shows a flow chart which may be performed by a computing device and with respect to a machine learning algorithm, such as may be executed on the artificial neural network 100. In step 301, input data for a machine learning algorithm may be received. The input data may be in any format, and need not be formatted for direct input into a machine learning algorithm. For example, in step 301, one or more intermediate steps may be performed to format the input data such that it may be input into a machine learning algorithm. Example formats which the input data may be stored in include one or more databases, spreadsheets, text files, or the like. The input data may be received in a variety of data types, such as integers, floating-point values, Boolean values, strings, or the like. The input data may be associated with metadata describing the input data, e.g., by characterizing one or more columns of a table, describing the source and/or reliability of all or portions of the input data, or the like. The input data may be received, e.g., from another computing device such as a server.

In step 302, the input data may be analyzed to determine one or more biases associated with the input data. A bias may correspond to any undesirable output from a machine learning algorithm. For example, if the input data for potential car purchasers comprises quantitative values (e.g., customer income), Boolean values (e.g., whether or not the customer is married), and arbitrary strings (e.g., a street address of the customer), machine learning algorithm output may unduly prioritize the quantitative values over the Boolean values and/or the arbitrary strings. The biases may be explicit. For example, the input data may be configured in a manner that prioritizes one portion of the input data (e.g., customer age) over another portion of the input data (e.g., customer neighborhood). The biases may be a predicted bias. For example, the input data may comprise a full set of information for a first variable (e.g., customer age) but only a partial set of information for a second variable (e.g., customer brand loyalty), suggesting that the machine learning algorithm may more readily produce output based on the first variable but not the second variable. As another example, evaluation of the input data may suggest that, based on a history of output from a machine learning algorithm, that the input data is likely to generate output data comprising one or more output biases.

In step 303, based on the biases, the input data may be grouped. Grouping of the input data may be performed in order to modify the context in which the input data is presented to the machine learning algorithm. For example, rather than providing a machine learning algorithm a single set of data for customers nationwide, the input data may be grouped such that the machine learning algorithm is provided multiple sets of data, grouped by neighborhood and state, of the same customers. Groups may comprise one or more portions of the input data. Groups may be based on, e.g., features and/or categories of the input data. For example, input data corresponding to personal information about customers may be grouped based on an age of a customer.

Grouping the input data may comprise adding data to, replacing data in, and/or discarding data from the input data. The input data may be grouped based on a quantitative value (e.g., customer income), and values corresponding to one or more groups in the input data may be replaced with predetermined strings or values (e.g., grouping customers into high, moderate, and low income groups, and replacing income data in each group with an indication of the group). The input data may be grouped based on one or more thresholds, and the input data not satisfying at least one of the thresholds may be discarded. For example, customers with addresses in cities may be kept in groups corresponding to such cities, whereas customers without addresses in cities may be removed from the input data. As another example, customers with jobs that provide substantial year-end bonuses may be grouped and separated from customers with jobs that do not provide such bonuses.

Grouping may be based on one or more dimensions. For instance, input data may be grouped on demographics, data commonalities, thresholds, ranges, or the like. As a particularized example, input data for customers of luxury sedans may be grouped based on neighborhood and then subdivided based on number of children A particularized example helps illustrate the value of grouping input data. Though college students under the age of twenty-one may be unlikely to purchase a vehicle themselves, some college students may nonetheless have a new or used vehicle purchased for them. As such, a machine learning algorithm may undesirably discard the vehicular preferences of college students because, from a purely financial perspective, such college students have no demonstrated ability to purchase a new vehicle. Nonetheless, from a practical perspective, the desires of such college students may influence their parents' shopping behavior on their behalf such that, for example, a college student's desire for a hybrid sedan may encourage their parents to purchase a hybrid sedan and loan it to them. Thus, grouping college students with adults likely to have children who are college students may be desirable in order to determine their collective likelihood to purchase a particular vehicle.

In step 304, the input data may be weighted. Weights may be configured to reduce the bias in the input data by, e.g., emphasizing or de-emphasizing all or portions of the input data. Weights need not merely comprise a multiplier to values in the data, but may comprise, e.g., explicitly tagging one or more portions of the input data with a level of importance (e.g., as important, moderately important, important, very important, with a percentage value corresponding to importance, etc.), modifying one or more values in the input data, such as converting a first type of data in the input data into a second type of data in the input data (e.g., by transforming quantitative values into Boolean values, strings into quantitative values, or the like), or other such modification of the input data.

The weights applied in step 304 may be configured to emphasize one or more features of the input data. For example, one or more weights may be applied to customer addresses in order to encourage a machine learning algorithm to provide output based on the customer addresses. As another example, one or more weights may be applied to data indicative of customers' environmental consciousness in order to encourage a machine learning algorithm to provide output based on customers' environmental consciousness.

In step 305, the input data may be provided to a machine learning algorithm. The input data may be provided via the external source 160 and/or one or more of the input nodes 110a-n. The input data may be provided to the machine learning algorithm by, e.g., transmitting the data to a machine learning engine and via a computer network.

In step 306, output data from the machine learning algorithm may be received. The output data need not be in any particular format, and may be received via one or more of the output nodes 140a-n. For example, the output may be one or more tags applied to the input data, one or more decisions, a Boolean value, or the like. The output data may be tagged or otherwise modified to reflect that it has been the product of grouped and/or weighted input data. In this manner, a later recipient of the output data may be placed on notice that the output data was the product of intentionally modified input data.

In step 307, the output data may be evaluated. The output data may be evaluated to determine one or more results, including one or more biases. For example, if the machine learning algorithm is configured to determine one or more customers who are predicted to buy an expensive luxury sedan, then the customers identified may be evaluated. As a particular example, if the machine learning algorithm output data indicates that a one-year-old baby is likely to buy the expensive luxury sedan, then it may be determined that the machine learning algorithm drew improper correlations or associations with respect to the input data.

Evaluation of the output data may comprise determining if the output data is associated with one or more biases. The biases may correspond to the biases determined in step 302. A bias determined with respect to output data may correspond to a determination that the output data reflects undesirable emphasis with respect to one or more portions of the input data. For example, a bias in output data from a machine learning algorithm tasked with determining which customers are likely to purchase an expensive luxury sedan may correspond to the machine learning algorithm placing too much emphasis on customer income and too little income on customers' neighborhood.

In step 308, it is determined whether the input data should be modified. As part of evaluating the output data in step 307, one or more changes to the input data may be determined. Based on the output data being biased with respect to a first portion of the input data, one or more changes may be determined to counterbalance such bias. For example, if output data from a machine learning algorithm suggests undesirable emphasis on customer income, then the portions of the input data corresponding to customer income may be discounted in order to raise the importance of other portions of the input data. As another example, if output data from a machine learning algorithm suggests that largely unrelated customers (e.g., two potential customers in two entirely different countries) were associated by the machine learning algorithm, one or more new groupings to the input data may be determined in order to lessen or prevent such an association (e.g., such as by grouping the two customers such that they are entirely segregated from one another). If the answer is yes, the flow chart returns to step 302, and the modifications are implemented. For example, by returning to step 302, different and/or additional weights may be applied to the input data, and/or the input data may be further and/or differently grouped. Otherwise, the flow chart ends.

The loop formed in the flow chart shown in FIG. 3 may be used to dynamically adjust weights and groups in the input data in order to isolate and/or emphasize various aspects of the input data. A computing device may be configured to repeatedly modify weights and groupings of input data to cause a machine learning algorithm to provide different outputs. Thus, different sets of output data may be generated based on differently grouped and weighted input data. The output data may be tagged and otherwise associated with the grouping and/or weighting of the input data used to create the output data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A machine learning system, comprising:
   a computing device including an artificial neural network executing a machine learning algorithm;
   wherein the computing device includes at least one processor and memory storing computer-executable instructions that, when executed by the at least one processor cause the computing device to:
   determine input data for the artificial neural network;
   identify one or more biases in the input data, the one or more biases including prioritizing quantitative values in the input data over Boolean values and strings in the input data;
   group, based on the one or more biases, the input data into one or more input data groups, wherein the one or more input data groups are groups of quantitative values, Boolean values and strings;
   apply, based on the one or more biases, weights to the one or more input data groups to generate weighted one or more input data groups by associating each of the one or more input data groups with a level of importance;
   transmit, to the artificial neural network, the weighted one or more input data groups;
   train the artificial neural network to generate output data based on the weighted one or more input data groups received via one or more input nodes;
   determine, based on the output data, one or more output biases in the output data; and
   apply, based on the one or more output biases in the output data, second weights to the one or more input data groups.

2. The machine learning system of claim 1, wherein the instructions further cause the computing device to:
   group, based on the one or more output biases in the output data, the input data into one or more second input data groups.

3. The machine learning system of claim 1, wherein grouping the input data includes group the input data by discarding one or more portions of the input data.

4. The machine learning system of claim 1, wherein applying weights to the one or more input data groups includes converting a first type of data into a second type of data.

5. A method comprising:
   receiving, by a computing device having at least one processor and memory storing computer-executable instructions, input data for an artificial neural network executing a machine learning algorithm;
   identifying, by the at least one processor, one or more biases in the input data, the one or more biases including prioritizing quantitative values in the input data over Boolean values and strings in the input data;
   grouping, by the at least one processor and based on the one or more biases, the input data into one or more input data groups, wherein the one or more input data groups are groups of quantitative values, Boolean values and strings;
   applying, by the at least one processor and based on the one or more biases, weights to the one or more input data groups to generate weighted one or more input data groups by associating each of the one or more input data groups with a level of importance;
   transmitting, by the at least one processor and to the artificial neural network, the weighted one or more input data groups;

training, by the at least one processor, the artificial neural network to generate output data based on the weighted one or more input data groups received via one or more input nodes;
determining, by the at least one processor and based on the output data, one or more output biases in the output data; and
applying, by the at least one processor and based on the one or more output biases in the output data, second weights to the one or more input data groups.

6. The method of claim 5, further comprising:
grouping, by the at least one processor and based on the one or more output biases in the output data, the input data into one or more second input data groups.

7. The method of claim 5, wherein grouping the input data includes discarding one or more portions of the input data.

8. The method of claim 5, wherein applying weights to the one or more input data groups includes converting a first type of data into a second type of data.

9. An apparatus comprising:
one or more processors; and
memory storing instructions that, when executed by the one or more processors, cause the apparatus to:
receive input data for an artificial neural network executing a machine learning algorithm;
identify one or more biases in the input data, the one or more biases including prioritizing quantitative values in the input data over Boolean values and strings in the input data;
group, based on the one or more biases, the input data into one or more input data groups, wherein the one or more input data groups are groups of quantitative values, Boolean values and strings ;
apply, based on the one or more biases, weights to the one or more input data groups to generate weighted one or more input data groups by associating each of the one or more input data groups with a level of importance;
transmit, to the artificial neural network, the weighted one or more input data groups;
train the artificial neural network to generate output data based on the weighted one or more input data groups received via one or more input nodes;
determine, based on the output data, one or more output biases in the output data; and
apply, based on the one or more output biases in the output data, second weights to the one or more input data groups.

10. The apparatus of claim 9, wherein the memory stores instructions that, when executed by the one or more processors, further cause the apparatus to:
group, based on the one or more output biases in the output data, the input data into one or more second input data groups.

11. The apparatus of claim 9, wherein grouping the input data comprises discarding one or more portions of the input data.

12. The apparatus of claim 9, wherein applying weights to the one or more input data groups comprises converting a first type of data into a second type of data.

* * * * *